May 18, 1926.
A. MOORE
POLE MONOCYCLE
Filed Feb. 8, 1923
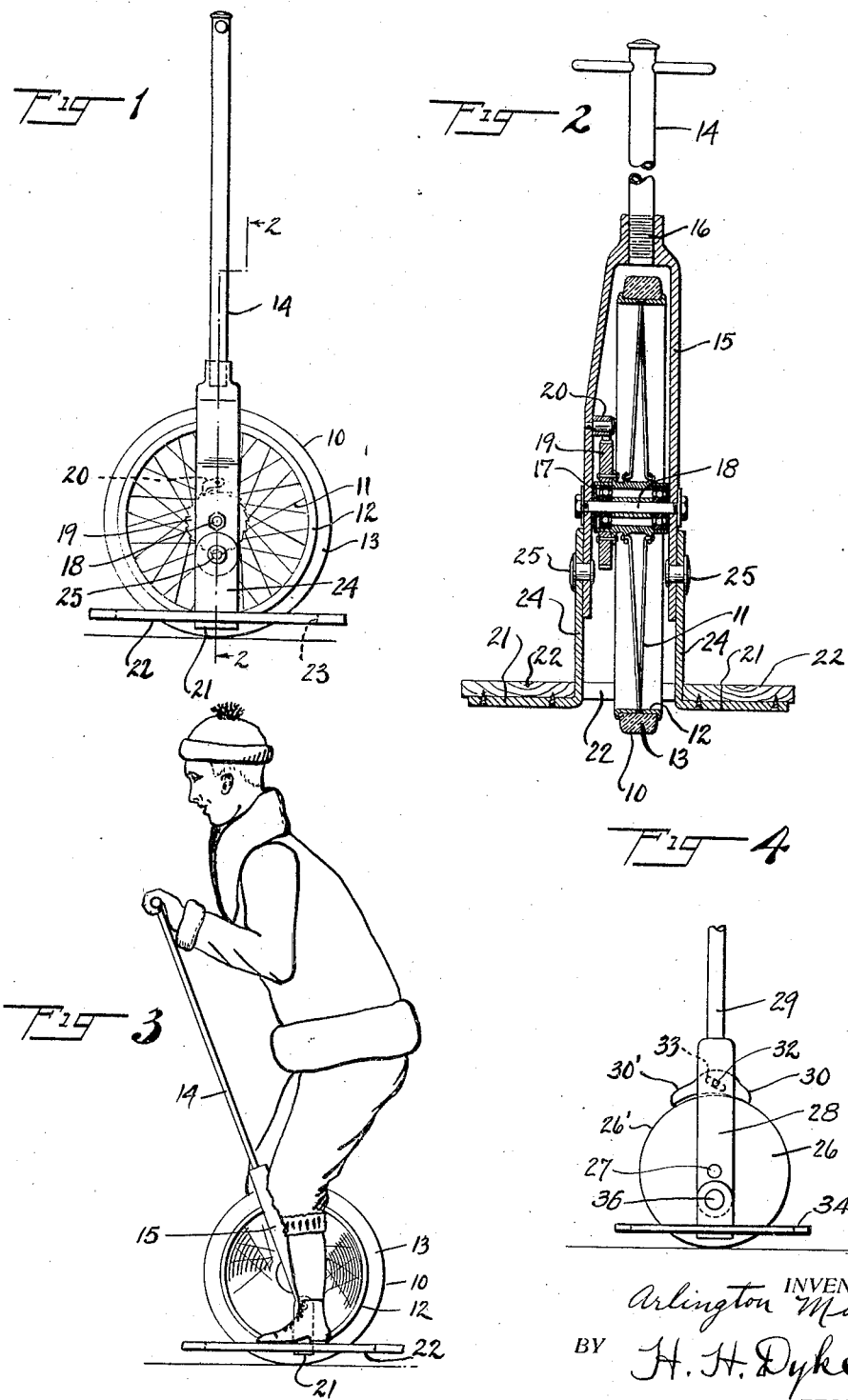
INVENTOR
Arlington Moore
BY H. H. Dyke
ATTORNEY Patented May 18, 1926.

1,585,258

UNITED STATES PATENT OFFICE.

ARLINGTON MOORE, OF WORCESTER, MASSACHUSETTS, ASSIGNOR TO MOORE INVENTIONS CORPORATION, OF WORCESTER, MASSACHUSETTS, A CORPORATION OF MASSACHUSETTS.

POLE MONOCYCLE.

Application filed February 8, 1923. Serial No. 617,711.

My invention relates to a pole propelled monocycle adapted for use for purposes of sport, exercise and the like, principally by children.

The device of the present invention comprises a wheel, which is preferably of a relatively small diameter, so as to be adapted to go between the legs of the user. A foot support is provided on which the user may stand, and a combined steering and propelling means is provided having preferably the form of a pole, which may be provided with handles and is adapted to be rocked or oscillated back and forth, thus causing the wheel to turn. At the same time the device is well adapted to be pushed by the foot of the user or the user may run and jump on the footrest, holding on to the pole, and the apparatus may be made use of in a great variety of ways according to the whim, caprice and ingenuity of the user.

The embodiments of the invention selected for illustration only, and not for limitation of the invention, are shown in the accompanying drawings in which Fig. 1 is a side view of a pole monocycle embodying the invention; Fig. 2 is a cross-sectional view taken on the line 2—2, Fig. 1; Fig. 3 is a side view showing the monocycle being propelled by the pole; and Fig. 4 is a side view of a modified embodiment of the invention.

Wheel 10 may be of any construction, as a disk wheel of metal or wood, a spoked wheel, etc., a wheel with wire spokes 11 being illustrated. The channeled wheel rim 12 is preferably provided with a solid rubber tire 13, similar to those used on buggy wheels, and which may be secured in place in a variety of known ways. Various other forms of tire, as pneumatic, etc., may be used, but the solid buggy wheel tire is deemed preferable. Wheel 10 has mounted thereon an upwardly extending pole 14. Said pole 14 is mounted to turn freely with respect to the wheel in one direction and when rocked in the other direction to cause the wheel to rotate. In the form shown, the pole 14 has a yoke 15 on its lower end, being secured thereto by screw joint 16, and the wheel 10 turns freely as on the ball bearing 17 on the shaft 18 extending through the yoke 15. The form of driving connection illustrated consists of a ratchet wheel 19 secured to turn with the wheel 10 and a pawl 20 on the yoke 15 adapted to be depressed by gravity to engage the ratchet wheel 19 and cause the wheel 10 to turn when the pole is moved in one direction, the pawl 20 riding freely on the teeth of the ratchet wheel 19 when the pawl is rocked in the other direction.

This actuating connection is for illustration only and various forms of actuating connections may be used, so long as the rocking of the pole in one direction causes the wheel to turn and the pawl or equivalent device to move back freely without affecting the wheel. The wheel is, of course, free to run ahead just as the pole is free to be turned backwardly with respect to the wheel, the pawl running freely over the ratchet teeth.

The yoke 15 has a foot support 21 pivotally connected thereto, so that the foot support 21 may hang therefrom. In the form shown, the foot support 21 comprises a board or the like 22, which extends entirely around the base of the wheel 10 and has a central opening 23 formed therein, through which the wheel 10 may pass, and a pair of vertically extending members 24 pivotally secured to the arms of yoke 15, at 25, 25. The pivotal connections 25, 25 between the yoke 15 and foot support 21 are arranged below the axle 18 of wheel 10, so that the weight of the user applied to the foot rest 21 serves to maintain the pole 14 in a normally erect position. In use, the boy or other user stands on the foot support 21 and propels the device by rocking the pole 14 back and forth, leaning or throwing his body in appropriate direction to maintain balance, or he may coast, the wheel 10 turning freely under ratchet 20, or he may actuate the device, partly in the manner first described, and partly by striking a foot on the ground, or by running and jumping on the foot rest, or in various other ways which will readily suggest themselves to the user. It will be seen that as the pole 14 is pushed forward by the user there is a certain amount of lifting of the footrest and the weight of the user which takes place due to the relative arrangement of the parts, and as the pole is retracted there is a corresponding slight lowering of the footrest and body weight, which adds to the attractiveness of the device when used by children.

Fig. 4 illustrates an inexpensive and modified embodiment of the invention, consisting of a solid wood wheel 26 adapted to rotate on axle 27 passing through yoke 28 of upright pole 29. Instead of a ratchet and pawl, the actuating means for this form of device consists of a wooden shoe 30 which is adapted to bear upon the peripheral surface 26' of wheel 26. Shoe 30 is slidably fastened in the upper portion of yoke 28 by pin 32 which extends through the yoke and works in elongated slot 33 in shoe 30. Slot 33 is arranged at an incline, so that forward movement of pole 29 away from the user brings shoe 30 down into frictional contact with surface 26', and causes shoe 30 to rotate wheel 26, thereby propelling the monocycle, and upon backward movement of pole 29 toward the user, shoe 30 is moved away from and out of contact with the wheel 26, leaving the wheel free to turn. Shoe 30 is overbalanced on the forward end by enlarged portion 30', which tends to keep the forward end of shoe 30 depressed and insures same making actuating contact with surface 26'. Peripheral surface 26', being roughened by continual contact with the ground, makes good frictional contact with shoe 30. The footrest 34 is pivoted at 36 to the lower portion of yoke 28 in a manner similar to the pivoting of the footrest 21 to yoke 15 as shown in Figs. 1 to 3.

It will be seen that the invention provides a simple, novel and attractive device to be used for sport, exercise and the like. Modifications and changes may be resorted to within the scope of my claims without departing from the spirit or principle of my invention.

I claim:

1. The combination with a wheel and its axle, of a pole having its lower portion in the form of a yoke and pivoted at the wheel axle on each side of the wheel, and a foot support pivoted to the yoke in each side of the wheel at a point beneath the wheel axle and depending therefrom.

2. The combination with a wheel and its axle, of a pole terminating in a yoke, the axle of the wheel being secured to the yoke arms on each side of the wheel, and a foot support extending entirely around the wheel near the point of bearing of the wheel on the ground and being vertically connected with the yoke arms below the wheel axle.

3. The combination with a wheel and its axle, of a pole having a handle bar at its upper end and having its lower end formed into a yoke, the wheel axle being secured in the arms of the yoke, a foot support comprising vertically extending members pivoted to the yoke arms below the wheel axle, and a foot support member apertured for passage of the wheel and secured to said vertically extending members on each side of the wheel.

In testimony whereof, I have signed my name hereto.

ARLINGTON MOORE.